Oct. 9, 1956 D. M. GLASER 2,765,548
MARINE PLOW
Filed June 22, 1953 4 Sheets-Sheet 1
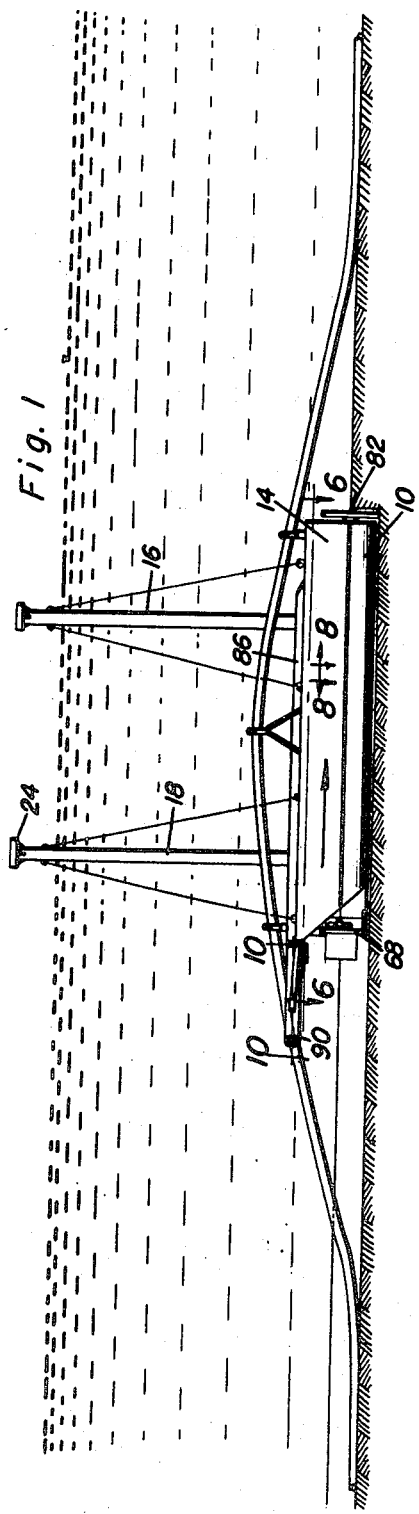
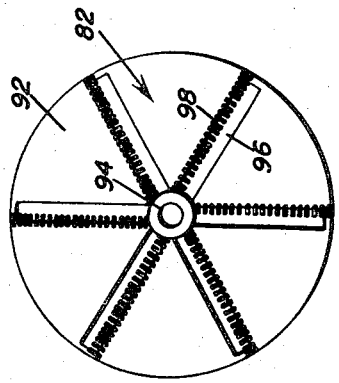
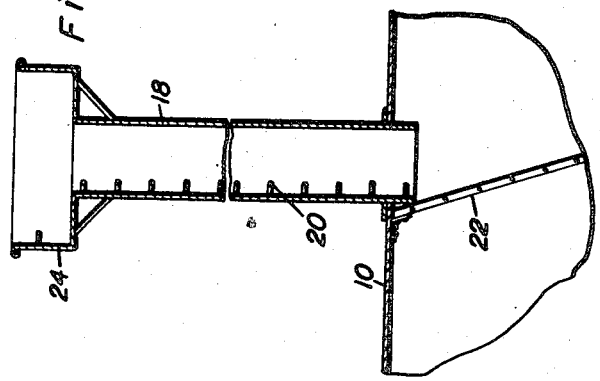
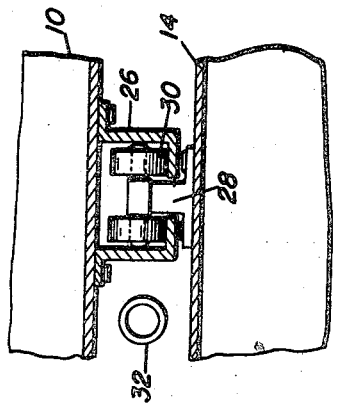
Donald Morris Glaser
INVENTOR.

Oct. 9, 1956
D. M. GLASER
2,765,548
MARINE PLOW
Filed June 22, 1953
4 Sheets-Sheet 2
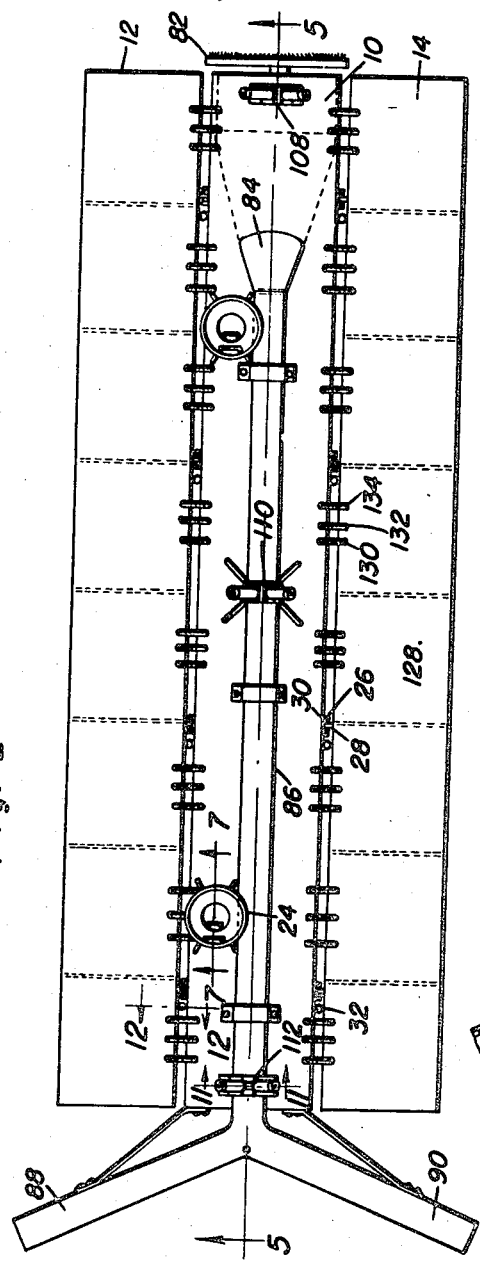
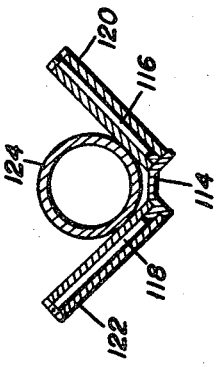
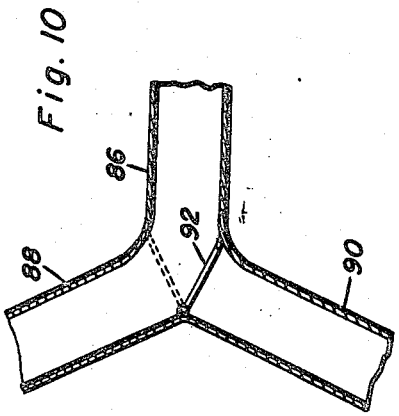
Donald Morris Glaser
INVENTOR.
BY
Attorneys Oct. 9, 1956  D. M. GLASER  2,765,548
MARINE PLOW
Filed June 22, 1953  4 Sheets-Sheet 3
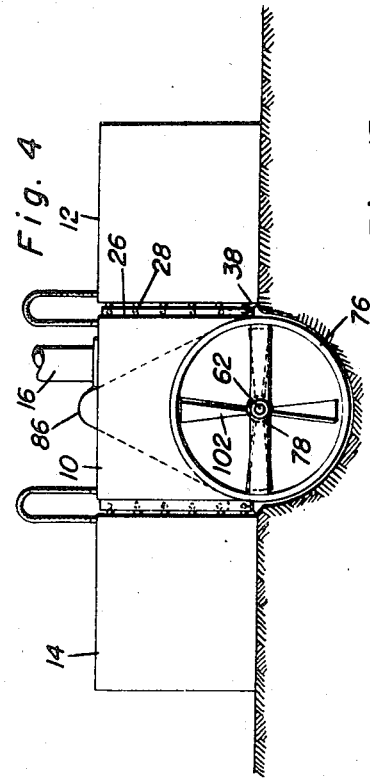
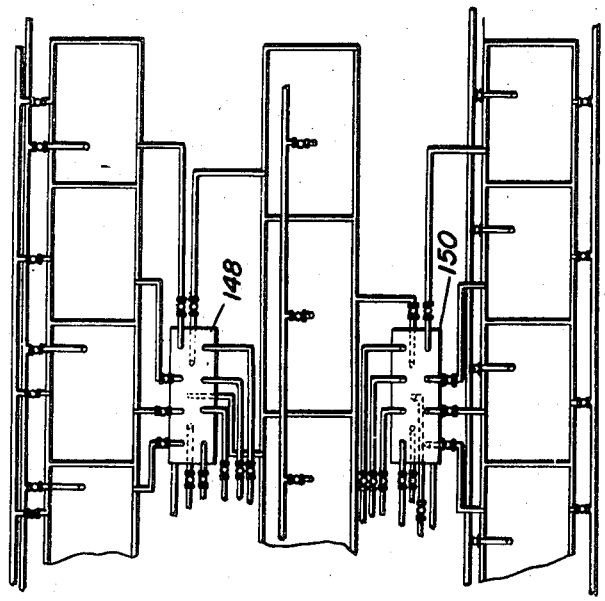
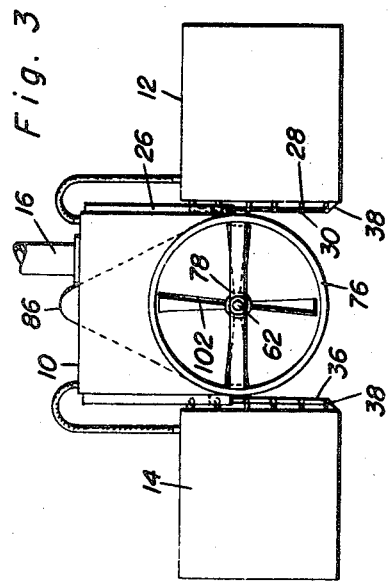
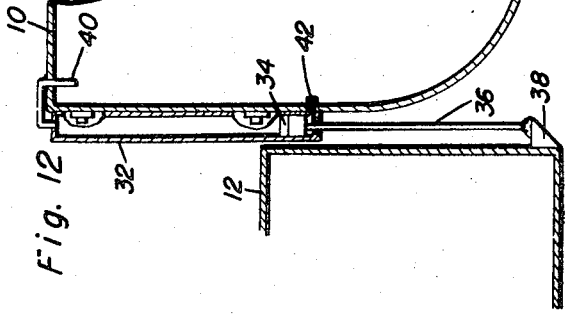
Donald Morris Glaser
INVENTOR.

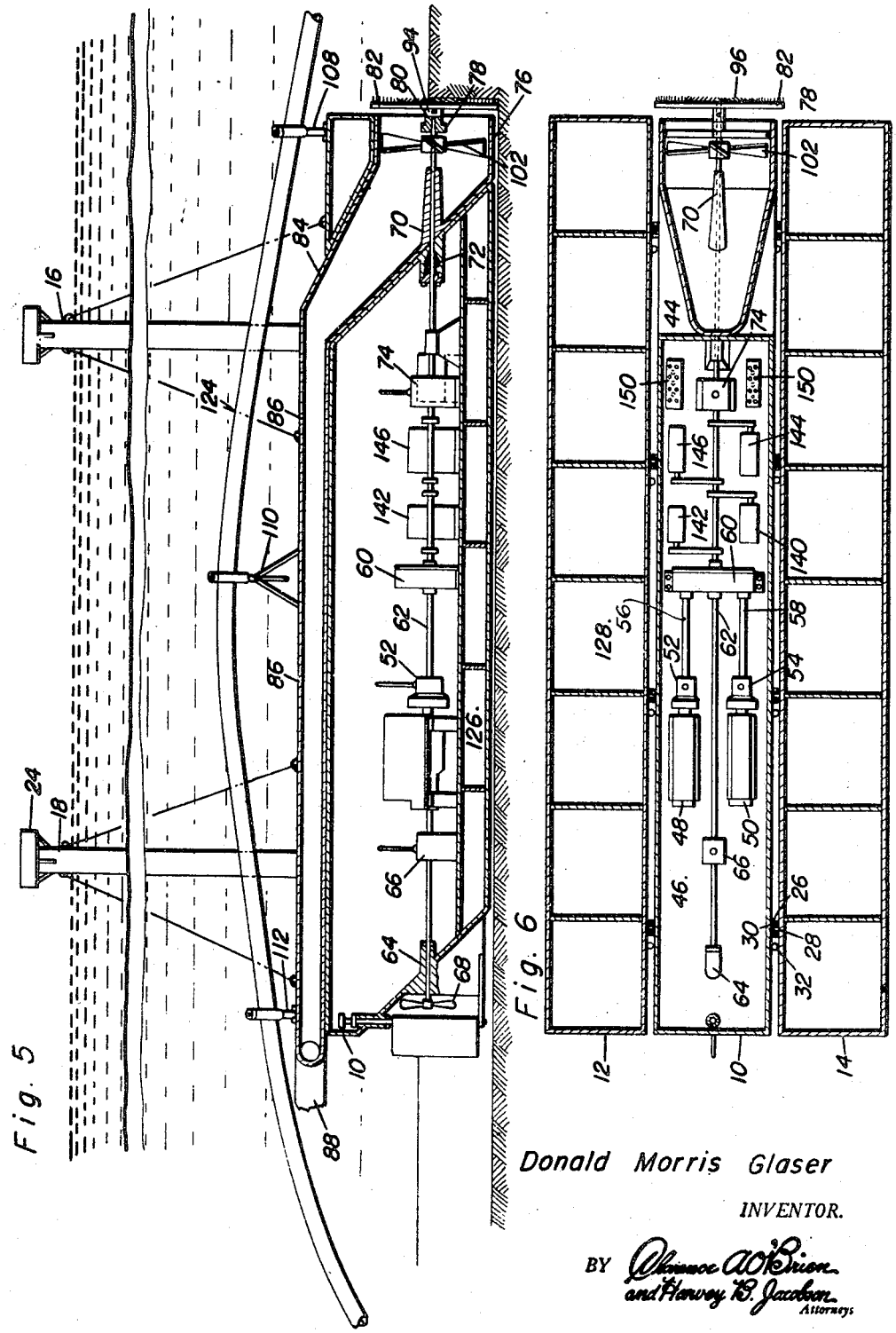

United States Patent Office 2,765,548
Patented Oct. 9, 1956

2,765,548

MARINE PLOW

Donald Morris Glaser, Lafayette, La.

Application June 22, 1953, Serial No. 363,088

7 Claims. (Cl. 37—77)

This invention relates to a marine plow and particularly to a plow for dredging a trench at the bottom of a body of water.

Constructing pipe lines and electric cables and other such communications which must lay on the bottom of a body of water, as for example, in pipe lines and electric lines extending to oil wells off shore and in the body of a lake, ocean, or the like, it is very desirable that the cables, pipe lines and such be covered up so that they will not be damaged by the action of the sea or by the action of boats, or other things which may become entangled with them. Heretofore, it has been extremely difficult to provide a marine plow which would follow the contours of the bottom of the ocean, bay, or other body of water and dig a sufficiently deep furrow that pipe lines, cables, or the other such things might be laid therein and covered by the action of the water to be out of the range of boats, anchors, or other objects floating in or carried by the water.

The present invention provides a marine plow having a longitudinally disposed engine room or main cabin with a rotary cutter mounted on the forward end thereof and a scoop adjacent the cutter with an impeller for causing the dirt, water, and other material passing through the cutter to be discharged into a conduit which extends rearwardly of the chamber and preferably to be discharged at one side of the longitudinal chamber. Flotation or buoyancy tanks are mounted on either side of the longitudinal chamber and have fluid pump connections thereto so that air, water, or other fluid may be pumped in or out of the buoyancy tanks as is desired to maintain the tanks in proper condition to maintain the cutter at any desired position with respect to the bottom of the body of water. Entrance towers are placed on the engine room or longitudinal chamber and extend upwardly from the chamber to a position above the surface of the water so that air may be pumped in and out of the chamber and workmen may readily enter the chamber to perform any necessary operation therein. Pipe or cable guides are provided on the top of the chamber so that the pipe to be buried may be picked up, passed over the chamber and dropped into the furrow made by the plow after which the action of the waves will cause the sand or debris in the bottom of the body of water to cover over the pipes so that it will be out of range of danger from objects carried in or by the water.

It is accordingly an object of this invention to provide an improved marine plow.

It is a further object of the invention to provide a marine plow which may operate at any desired relation to the surface of the bottom of a body of water.

It is a still further object of the invention to provide a marine plow having means for entering or leaving the plow while the plow is submerged under a body of water.

A further object of the invention is to provide a marine plow having a rotary cutter at the forward end thereof and means for discharging the material dislodged by the cutter at the rear of the plow.

A further object of the invention is to provide a marine plow having means to guide a pipe, cable, or other material longitudinally across the plow.

A still further object of the invention is to provide an improved buoyancy control means for a marine plow.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevation of the marine plow in operative position;

Figure 2 is a top plan view of the plow;

Figure 3 is a front elevation of the plow in carrying position;

Figure 4 is a front elevation of the plow in operative position;

Figure 5 is a sectional elevation taken substantially on the plane indicated by the line 5—5 of Figure 2 and showing a sectional elevation of the marine plow in operative position;

Figure 6 is a sectional plan view taken substantially on the plane indicated by the line 6—6 of Figure 1 and showing the arrangements of the machinery and the plow;

Figure 7 is a sectional elevation taken substantially along the plane indicated by the line 7—7 of Figure 2 and shows the construction of the entrance tube for the plow;

Figure 8 is a horizontal section taken through the adjustable interlock between the power chamber and the buoyancy chamber and taken substantially on the plane indicated by the line 8—8 of Figure 1;

Figure 9 is an enlarged plan view of the plow point or rotary cutter;

Figure 10 is a sectional view of the mud discharge control taken substantially on the plane indicated by the line 10—10 of Figure 1;

Figure 11 is a cross-sectional view of the pipe guide taken substantially on the plane indicated by the line 11—11 of Figure 2;

Figure 12 is a vertical section through the adjusting cylinder taken substantially on the plane indicated by the line 12—12 of Figure 2; and Figure 13 is a schematic diagram of the submerging control connections.

In the exemplary embodiment according to the invention, a longitudinally extending elongated main chamber or engine room 10 has connected on either side thereof, flotation or buoyancy chambers 12 and 14. The elongated main chamber or engine room 10 is preferably substantially rectangular in cross-section with the exception of the bottom which is semi-cylindrical in shape. The flotation or buoyancy chambers 12 and 14 may, of course, be of any shape but preferably are substantially rectangular in shape for convenience in locking the main chamber 10.

Entrance tubes or conning-towers 16 and 18 are arranged and mounted in an upright position on the top of the main elongated chamber 10 and are of sufficient size that ladder rungs 20 may be placed therein so that workmen may readily leave or enter the chamber 10 through the towers 16 and 18. A ladder 22 may be placed at the bottom of the conning-towers 16 and 18 so that the workmen may readily move from the bottom of the chamber 10 into the entrance tubes. A crow's nest or landing deck 24 may be placed at the top of the towers 16 and 18 so that a workman or other person entering a chamber 10 may readily position himself at the top of the tower for utilization of the ladder rungs 20 passing upwardly or downwardly through the tubes.

The buoyancy chambers 12 and 14 are secured to the elongated chamber 10 by means of a plurality of interlocking movable joints herein indicated as a T-slide rail 26 attached to the chamber 10 and an interengaging roller member, including a bracket 28 having a pair of rollers 30 journalled thereon for engagement inside of the T track 26 so that the chambers 12 and 14 may have relative vertical movement with respect to the chamber 10 but are secured against lateral movement toward or away from the chamber 10. Vertical adjustment between the chambers 12 and 14 and the elongated chamber 10 is controlled by means of a fluid operated cylinder 32 having a piston 34 therein and a piston rod 36 extending therefrom. For convenience, the cylinder 32 is rigidly connected to the side of the elongated chamber 10 and the piston rod 36 is connected to a bracket 38 adjacent the bottom of the buoyancy tanks 12 and 14. Fluid from any suitable source is applied to the top of the cylinder 32 by means of a conduit 40 and to the bottom of the cylinder by means of the conduit 42 which may be driven by any suitable source presently to be described.

The elongated chamber 10 is divided into a plurality of sections including a forward main plow section 44 and a main engine room section 46. The main engine room section contains a plurality of driving motors, such as the diesel motors 48 and 50. Each of the motors 48 and 50 is provided with a clutch and disconnecting gear box 52 and 54 respectively so that the engine drive shafts 56 and 58 may be connected or disconnected from the motors 48 and 50 as may be desired. The engine drive shafts 56 and 58 are connected into a gear casing 60 in which they are connected to a main drive shaft 62 which extends longitudinally through the central portion of the engine chamber 46. The rearward portion of the main drive shaft 62 extends rearwardly after the chamber 10 and extends through a drive bushing 64 adapted to contain a water tight packing. A clutch and reversing gear 66 is interposed in the line 62 and a propeller 68 is mounted on the rear end of the shaft 62 and may be operative at will by means of the clutch and gear box 66. The forward portion of the shaft 62 extends forwardly of the chamber and extends through the bushing 70 having a water tight packing 72. The clutch and reversing gear box 74 is placed between the shaft 62 so that the forward portion of the shaft 62 may be driven at will by the control box 74.

A substantially cylindrical scoop member 76 is placed in the forward end of the chamber 10 and a transverse support beam 78 is placed across the open end thereof to support a bearing 80 which receives the forward end of the shaft 62 which extends longitudinally therethrough. The rotary plow 82 is mounted on the end of the shaft 62 exteriorly of and forwardly of the chamber 10 so that the plow is in contact with the bottom of the body of water ahead of the scoop 76. The scoop 76 is provided with a converging throat 84 which communicates with a conduit 86 which is placed on the top of the chamber 10 and extends to the rear end thereof where it is provided with branching members 88 and 90. The branches 88 and 90 extend diagonally and laterally of the chamber 10 and preferably, also, laterally sufficient distance to clear the flotation chambers 12 and 14. A gate 92 is placed at the junction of the laterals 88 and 90 with the conduit 86 so that the fluid flowing through the conduit 86 may be directed in either of the lateral conduits 88 or 90 and discharged laterally of the plow.

The plow or cutter 82 is constituted as a disk 92 having a hub 94 and a plurality of radially extending slots 96 on the edge of which are placed cutter teeth 98 for digging up the material constituting the floor of the body of water.

In order to discharge the material dug up by the plow 82, an impeller 102 is mounted on the shaft 62 immediately behind the support bar 78 and rigidly connected thereto to turn therewith so that the material dug up by the plow 82 will be agitated by the propeller and driven through the throat 84 into the conduit 86 and outwardly through the laterals 88 or 90 to dispose of the material dug up by the plow 82.

In order to pick up and convey a pipe, cable, or other continuous object longitudinally across the chamber 10, a plurality of guide members are mounted on the top of the device, preferably constituting a forward guide 108, a central guide 110, and a rear guide 112. Each of the guide members constitutes a bracket 114 which may be mounted on any suitable type mounting and has laterally diverging arms or pins 116 and 118 extending upwardly therefrom and having rollers 120 and 122 thereon so that a continuous object such as the pipe 124 may rest on the rollers 120 and 122 and be readily conveyed longitudinally over the chamber 10.

Ballast tanks 126 are preferably provided in the lower portion of the chamber 10 to control the balance and buoyancy thereof. Obviously, any desired number of chambers may be used and may be separately or unit controlled as may be desired.

Flotation or buoyancy chambers 12 and 14 are preferably divided into a plurality of water tight compartments 128, preferably each compartment has a plurality of controlled conduits such as the conduits 130 and 132 and 134, for controlling the buoyancy of the device. A plurality of pumps or compressors 140, 142, 144, and 146 are connected in driving relation to the drive shaft 62 so that water, oil, air, or the like may be pumped into the various buoyancy compartments as may be desired. Suitable valve chambers 148 and 150 are provided so that any of the conduits leading to the various compartments may be connected to any of the pumps or compressors at will so that fluid may be pumped in or out of the tank or compartments as may be desired.

It will be apparent that the present invention provides a marine plow which may be floated at any desired depth in a body of water and particularly may be maintained in contact with the bottom of a body of water to plow a furrow therein.

It will further be apparent that the device may be maintained submerged and the operators go in and out through the conning-towers as well as pump air or other material therein to through the conning-towers while the exhaust material from the motors may be likewise exhausted through one of the towers. It will be further apparent that this plow will produce a furrow of appreciable depth so that a pipe line may be readily laid therein so that the action of the sea or other body of water will quickly close the dirt thereover so that it will be completely hidden out of danger.

In the operation of the device, the cylinders 32 will be operated to place the main elongated tank or body at the desired relation to the bottom of the body water after which the rotary plow will be set in operation to cut away the sediment or other material at the bottom of the body of water, while the impeller will cause it to be discharged laterally at the rear of the plow while the object being buried, such as a pipe, or cable, will be passed over the brackets and guides on the top of the container and dropped into the furrow immediately behind the plow. The plow may be totally or partially propelled by means of its own propeller or the propeller, if desired, may obviously be omitted and the device move forward by the utilization of a tug or other pulling device.

For purpose of exemplification, a particular embodiment of the invention has been shown and described according to the best present understanding thereof. However, it will be apparent to those skilled in the art that many changes and modifications may be made in the construction and arrangements of parts thereof without departing from the true spirit and scope of the invention.

What is claimed as new is as follows:

1. A marine plow comprising an elongated engine room chamber, a rotary cutter mounted in front of said chamber, a mud pump mounted adjacent said cutter, a mud discharge conduit extending laterally from said chamber, a motor in said engine room operatively connected to said cutter and to said pump, flotation chambers adjustably mounted laterally of said engine room chamber, track and roller means connecting said flotation chambers to said engine room chamber, fluid cylinders connected between said flotation chambers and said engine room chamber for controlling the vertical adjustment between said flotation chambers and said engine room chamber.

2. A marine pipe laying device comprising an elongated chamber, a semi-cylindrical bottom on said chamber, a motor mounted in said chamber, a longitudinally extending drive shaft mounted in said chamber coaxial with said bottom, said drive shaft extending forwardly of said chamber, a rotary cutter mounted on said shaft and positioned forward of said chamber, a driving connection between said motor and said drive shaft, a scoop mounted in the forward end of said chamber and open to said cutter, a discharge conduit communicating with said scoop, said discharge conduit extending longitudinally of said chamber and terminating aft of said chamber, an impeller mounted in said scoop, a driving connection between said shaft and said impeller.

3. A marine pipe laying device comprising an elongated chamber, a semi-cylindrical bottom on said elongated chamber, a motor mounted in said chamber, a longitudinally extending drive shaft mounted in said chamber coaxial with said bottom, said drive shaft extending forwardly of said chamber, a rotary cutter mounted on said shaft and positioned forward of said chamber, a driving connection between said motor and said drive shaft, a scoop mounted in the forward end of said chamber and open to said cutter, a discharge conduit communicating with said scoop, said discharge conduit extending longitudinally of said chamber and terminating aft of said chamber, an impeller mounted in said scoop, a driving connection between said shaft and said impeller, said drive shaft extending rearwardly of said chamber, a propeller mounted on said shaft rewardly of said chamber.

4. A marine pipe laying device comprising an elongated chamber, a semi-cylindrical bottom on said elongated chamber, a motor mounted in said chamber, a longitudinally extending shaft mounted in said chamber coaxial with said bottom, said drive shaft extending forwardly of said chamber, a rotary cutter mounted on said shaft and positioned forward of said chamber, a driving connection between said motor and said drive shaft, a scoop mounted in the forward end of said chamber and open to said cutter, a discharge conduit communicating with said scoop, said discharge conduit extending longitudinally of said chamber and terminating aft of said chamber, an impeller mounted in said scoop, a driving connection between said shaft and said impeller, buoyancy control chambers, said buoyancy chambers being adjustable with respect to the elongated chamber to adjust the operative position of said cutter attached to said elongated chamber.

5. A marine pipe laying device comprising an elongated chamber, a motor mounted in said chamber, a longitudinally extending shaft mounted in said chamber, said drive shaft extending forwardly of said chamber, a rotary cutter mounted on said shaft and positioned forward of said chamber, a driving connection between said motor and said drive shaft, a scoop mounted in the forward end of said chamber and open to said cutter, a discharge conduit communicating with said scoop, said discharge conduit extending longitudinally of said chamber and terminating aft of said chamber, an impeller mounted in said scoop, a driving connection between said shaft and said impeller, buoyancy control chambers adjustably attached to said elongated chamber, fluid pumps mounted in said elongated chamber, fluid conduits communicating said pumps with said buoyancy control chambers.

6. A marine pipe laying device comprising an elongated chamber, a motor mounted in said chamber, a longitudinally extending drive shaft mounted in said chamber, said drive shaft extending forwardly of said chamber, a rotary cutter mounted on said shaft and positioned forward of said chamber, a driving connection between said motor and said drive shaft, a scoop mounted in the forward end of said chamber and open to said cutter, a discharge conduit communicating with said scoop, said discharge conduit extending longitudinally of said chamber and terminating aft of said chamber, an impeller mounted in said scoop, a driving connection between said shaft and said impeller, a buoyancy control tank adjacent each side of said elongated chamber, interengaging track and roller means securing said buoyancy control tanks to said chamber whereby said tanks and said chambers are relatively vertically movable with respect to each other to determine the operative position of said cutter.

7. A marine pipe laying device comprising an elongated chamber, a motor mounted in said chamber, a longitudinally extending drive shaft mounted in said chamber, said drive shaft extending forwardly of said chamber, a rotary cutter mounted on said shaft and positioned forward of said chamber, a driving connection between said motor and said drive shaft, a scoop mounted in the forward end of said chamber and open to said cutter, a discharge conduit communicating with said scoop, said discharge conduit extending longitudinally of said chamber and terminating aft of said chamber, an impeller mounted in said scoop, a driving connection between said shaft and said impeller, a buoyancy control tank adjacent each side of said elongated chamber, interengaging track and roller means securing said buoyancy control tanks to said chamber whereby said tanks and said chambers are relatively vertically movable with respect to each other to determine the operative position of said cutter, fluid operated pistons and cylinders operative to adjust the vertical relation of said buoyancy control tanks with respect to said elongated chamber.

References Cited in the file of this patent

UNITED STATES PATENTS

| Number | Name | Date |
|---|---|---|
| 501,870 | Collins | July 18, 1893 |
| 710,765 | Cunningham | Oct. 7, 1902 |
| 813,935 | Avery | Feb. 27, 1906 |
| 1,019,610 | Donnelly | Mar. 5, 1912 |
| 1,097,722 | Lake | May 26, 1914 |
| 2,144,063 | Irvin | Jan. 17, 1939 |
| 2,215,460 | Childress | Sept. 24, 1940 |
| 2,371,174 | Kalix | Mar. 13, 1945 |
| 2,602,300 | Collins | July 8, 1952 |